(12) United States Patent
Tavares Andre

(10) Patent No.: US 11,484,951 B2
(45) Date of Patent: Nov. 1, 2022

(54) MILLING AND DEEP DRILLING MACHINE

(71) Applicant: CHETOCORPORATION, S.A., Santiago Da Riba-ul (PT)

(72) Inventor: Sergio David Tavares Andre, Vale de Cambra (PT)

(73) Assignee: CHETOCORPORATION, S.A., Loureiro Oaz (PT)

( * ) Notice: Subject to any disclaimer, the term of this patent is extended or adjusted under 35 U.S.C. 154(b) by 12 days.

(21) Appl. No.: 15/734,358

(22) PCT Filed: Jun. 19, 2019

(86) PCT No.: PCT/IB2019/055176
§ 371 (c)(1),
(2) Date: Dec. 2, 2020

(87) PCT Pub. No.: WO2019/244080
PCT Pub. Date: Dec. 26, 2019

(65) Prior Publication Data
US 2021/0162514 A1  Jun. 3, 2021

(30) Foreign Application Priority Data
Jun. 20, 2018  (PT) .......................................... 110794

(51) Int. Cl.
*B23Q 3/157* (2006.01)
*B23B 41/02* (2006.01)
*B23Q 3/155* (2006.01)

(52) U.S. Cl.
CPC .............. *B23B 41/02* (2013.01); *B23Q 3/157* (2013.01); *B23Q 3/15706* (2013.01);
(Continued)

(58) Field of Classification Search
CPC ................. B23B 41/02; Y10S 408/705; B23Q 3/155–3/15793; B23Q 5/20;
(Continued)

(56) References Cited

U.S. PATENT DOCUMENTS 3,191,260 A * 6/1965 Jorgensen .......... B23Q 3/15706
408/140
4,384,397 A  5/1983 Nelson
(Continued)

FOREIGN PATENT DOCUMENTS

CN  202846263 U  4/2013
CN  203409506 U  1/2014
(Continued)

OTHER PUBLICATIONS

Machine Translation of JP 2995305, which JP '305 was published Dec. 1999.*

(Continued)

*Primary Examiner* — Erica E Cadugan
(74) *Attorney, Agent, or Firm* — Lucas & Mercanti, LLP

(57) ABSTRACT

A milling and deep drilling machine operated by a control unit is provided, which commands the action of a robotic arm in a coordinated and automatic manner, being responsible for milling and deep drilling actions, and at least one technical tool storage cabinet. The robotic arm having a mobile structure, with a base structure along which a driving unit is moved, over sliding rails. The configuration of the milling mode in the machine is achieved by coupling a milling tool to the drive unit. For the configuration of the deep drilling mode, the base structure of the robotic arm has coupling device that allow the assembly of a cassette in which the deep hole drilling tool is installed 2 Claims, 4 Drawing Sheets

(52) U.S. Cl.
CPC ............. *B23Q 2003/1558* (2013.01); *B23Q 2003/15527* (2016.11); *Y10T 483/179* (2015.01); *Y10T 483/1738* (2015.01); *Y10T 483/1809* (2015.01)

(58) Field of Classification Search
CPC ....... B23Q 2003/1558; Y10T 483/1736; Y10T 483/1788; Y10T 483/1864; Y10T 483/1738
USPC ......... 408/705; 483/31, 53, 65, 32; 409/202, 409/212
See application file for complete search history.

(56) References Cited

U.S. PATENT DOCUMENTS

| | | | | |
|---|---|---|---|---|
| 2012/0134762 | A1* | 5/2012 | Wang | B23Q 11/0028 409/166 |
| 2015/0057139 | A1* | 2/2015 | Canuto | B23Q 3/15536 483/65 |
| 2017/0066094 | A1* | 3/2017 | Hoshi | B23B 41/02 |

FOREIGN PATENT DOCUMENTS

| | | |
|---|---|---|
| CN | 216421836 U * | 5/2022 |
| DE | 102005043399 A1 | 3/2007 |
| DE | 102009023519 A1 | 12/2010 |
| DE | 102010004765 A1 | 7/2011 |
| DE | 202019104405 U1 * | 10/2019 |
| EP | 2828034 B1 | 1/2016 |
| JP | 2995305 B2 * | 12/1999 |

OTHER PUBLICATIONS

Merriam-Webster's Collegiate Dictionary, 10th, ed., copyright 1998, pp. 109, 178, and 1258, re the defintions of "bezel", "castle", and "tree".*

Machine Translation of CN 216421836 U, which CN '836 was published May 2022.*

International Search Report and Written Opinion for Corresponding International Application No. PCT/IB2019/055176 (16 Pages) ( dated Nov. 4, 2019).

* cited by examiner

MILLING AND DEEP DRILLING MACHINE

CROSS-REFERENCE TO RELATED APPLICATIONS

This application is a 371 of PCT/IB2019/055176, filed Jun. 19, 2019, which claims the benefit of Portuguese Patent Application No. 110794, filed Jun. 20, 2018.

TECHNICAL DOMAIN

This application describes a milling and deep drilling machine.

BACKGROUND

Currently, it is observed that changing a deep drill bit is a process that requires human intervention—intervention that interrupts the automatic working cycle of a machine tool, significantly affecting the total machining time.

In fact, in the case of a milling and deep drilling machine, human intervention can occur in two situations:

i. The transition from milling mode to deep drilling mode, or vice versa, through the loading of a gun drill, hereafter referred to simply as the drilling tool, or milling tool;
ii. The changing of the drilling or milling tool.

Situation i., requires the automatic release of the tool and the intervention of the operator leading him to interrupt his work cycle. The operator is responsible for manually assembling all the equipment (tips, dampers, flanges, bezels, tools, cone) necessary for the correct coupling of the tool to the machine. Situation ii. requires the manual substitution, by the operator, of the tool and all of its supporting equipment (tip, dampers, flanges, bezels and cone) due to alterations to the intended diameter/length of the tool or to the wear thereof, for example.

SUMMARY

This application describes a milling and deep drilling machine comprising:
A robotic arm comprising:
  a mobile structure adapted to perform linear 3-dimensions movements inside the machine;
  a base structure comprising sliding rails and coupling means of the arm-cassette type;
  a tree that moves along a base structure across sliding rails;
At least one technical cabinet comprising:
  at least one milling tool, said milling tool comprising a cone for coupling to the tree and a mechanism for locking the rotation of the cone during the act of coupling to the tree; and/or
  at least one cassette, said cassette comprising:
    a drilling tool, comprising a cone for coupling to the tree and its cone support;
    a rotation locking mechanism adapted to lock the rotation of the cone during the act of coupling to the tree;
    a mechanical locking mechanism adapted to fix the position of the cone support;
    a cassette-arm type means of coupling;
  a control unit, comprising means of processing, specially configured to operate the robotic arm and at least one technical cabinet.

In one particular embodiment of the machine, the storage of at least one milling tool and at least one cassette in the technical cabinet occurs by means of automatic ties. The arm-cassette or cassette-arm coupling means may be of the automatic tie type.

In one particular embodiment of the machine, the installation of a deep hole drilling tool in the cassette is carried out using bezels, the number of which varies depending on the length of said tool. The bezel may comprise a locking plate, two elastic tabs, adapted to attach the damper that secures the tool to the cassette.

In one particular embodiment of the machine, the cone support of the deep drilling tool comprises a bearing to support the tool cone, a detachable flange, a locking pin and a shifting mechanism for positioning along the base structure of the robotic arm.

In yet another particular embodiment of the machine, the cassette rotation locking mechanism comprises a block, a spring and a stop bolt, where the block moves linearly on a course restricted by the action of the spring and the stop bolt.

In one particular embodiment of the machine, the mechanical locking mechanism comprises an adjustment ruler on which a castle moves which is adjustable to the various dimensions of the tool.

Finally, in one particular embodiment of the machine, the technical cabinet comprises a protective curtain and an external access window for manual intervention by the operator.

General Description

The present application arises from the need to automate the operation of a milling and deep drilling machine, avoiding intervention by an operator. For this purpose, a milling and deep drilling machine, hereafter simply referred to as a machine, is proposed, whose operation is commanded by a control unit, which operates the action of a robotic arm in a coordinated manner, which is responsible for the actions of milling and deep drilling, and at least one technical tool storage cabinet.

The robotic arm is formed of a mobile structure that ensures its linear, 3-dimensional movement inside the machine. The robotic arm comprises a base structure along which a drive unit moves, over sliding rails, hereafter referred to as a tree.

The configuration of the milling mode on the machine is achieved by coupling the tree to a milling tool, through a cone, for which purpose the tree is on the most external position of the robotic arm. The milling tools are stored in a technical locker in a location of the machine that the robotic arm can reach. For the configuration of the deep drilling mode, the base structure of the robotic arm comprises coupling means—arm-cassette automatic locking fittings—that allow for the assembly of a deep drilling cassette. The coupling between the cassette and the base structure of the robotic arm is achieved by means of complementary automatic ties, positioned in both components, for which purpose the tree is fully withdrawn into the most internal position of the base structure.

The cassettes are stored in a technical cabinet, by means of automatic ties—technical cabinet-cassette automatic locking fittings—in a location in the machine that the robotic arm can reach. Each cassette has a deep drilling tool with particular characteristics of diameter and length installed on it. The installation of the tool in the cassette is performed using a bezel, the number of which may vary depending on the length/diameter ratio of the tool. The operation of loading or removing the cassette is achieved by the automatic loading thereof on the base structure of the robotic arm, without interrupting the machining cycle, by the coordinated action of the control unit on the robotic arm and on the technical cabinet where it is stored.

For the automation of the actions of loading and removing a milling tool or cassette on the base structure of the robotic arm, ensuring the correct and uninterrupted operation of the machine, both are equipped with locking mechanisms. In the case of the milling tool, this comprises a rotation locking mechanism, with the purpose of ensuring the non-rotation of the cone of the tool during the act of coupling to the tree.

Regarding the cassette, it is equipped with two complementary locking mechanisms, which act at the level of the deep drilling tool installed on it and the tree of the robotic arm, to which it will be coupled. The first mechanism is the mechanical locking mechanism, which is designed to ensure the correct positioning and fixing of the cone support of the tool, which enables the tying to the tree. For this purpose, the cassette comprises an adjustment ruler on which the mechanical locking mechanism is moved and which contains a castle that is adjustable to the different dimensions of the gun drill. Depending on the length of the tool to be installed on the cassette and due to the interaction of the castle with the mechanical locking mechanism, it is permissible to lock the cone support of the tool in the appropriate position for subsequent coupling of the tree. The operation of installing the tool on the cassette, and the respective operationalization of the mechanical locking mechanism, is performed by the operator a priori of the operation of the machine. The second locking mechanism relates to the rotation lock, and is intended to ensure the non-rotation of the cone of the tool during the act of coupling to the tree.

The control unit is responsible for controlling the linear 3-dimensional movements of the robotic arm, inside the machine, and the technical cabinet, specifically the action of its protective curtain. The action of the control unit, on these two components, occurs at the level of the:
  i. Operationalization of deep drilling mode, through the loading onto the base structure of the robotic arm of a cassette stored in the technical cabinet;
  ii. Operationalization of the milling mode by the loading onto the base structure of the robotic arm of a milling tool stored in the technical cabinet;
  iii. Configuration of the milling or deep drilling mode by replacing the milling tool or cassette coupled to the base structure of the robotic arm, by changing the milling/drilling parameters—diameter/length of the tool, respectively;
  iv. Removal of the milling tool or cassette coupled to the base structure of the robotic arm, and consequent storage thereof in the technical cabinet.

For the loading of a milling tool onto the base structure of the robotic arm, as the operation defined in point ii. implies, the control unit operates on the robotic arm and the technical cabinet, as follows:
  the tree moves to its most external position;
  the robotic arm moves, through linear movements, to the technical cabinet, positioning itself next to the milling tool that is wished to load, prompting the opening of the protective curtain;
  the milling tool is then positioned in relation to the tree;
  the tree executes the linear movement towards the cone of the tool, followed by its tying to the tree, which enables the robotic arm, and by extension the machine, to perform the milling operation.

For the loading of a cassette onto the base structure of the robotic arm, as the operations defined in points i. and iii. imply, the control unit operates on the robotic arm and the technical cabinet, as follows:
  the tree moves to its most withdrawn position;
  then the robotic arm moves, through linear movements, to the technical cabinet, positioning itself next to the cassette that it is wished to load, leading to the opening of the protective curtain;
  this is followed by the movement of the robotic arm towards the cassette;
  the cassette-arm automatic locking fittings are disabled; the base structure of the robotic arm comes to rest against the cassette; the cassette-arm automatic locking fittings are enabled and then the technical cabinet-cassette automatic locking fittings are disabled;
  the robotic arm moves away from the technical cabinet and the closing of the protective curtain occurs;
  the tree executes a linear movement towards the cone of the tool, followed by its tying to the tree, which enables the robotic arm, and by extension the machine, to perform the deep drilling operation with the tool installed on the cassette.

Additionally, to perform the release of the milling tool or cassette, as defined in point iv., the control unit operates on the robotic arm and the technical cabinet, as follows:
  Release of the drilling tool:
  the tree performs the function of releasing the drilling tool installed on the cassette, releasing the cone of the tool, followed by the linear movement of the tree away from the cone, to an extreme position on the base structure of the robotic arm;
  this removal causes the activation of the cone-locking system work, so that it maintains its position in relation to the cassette, until a new loading operation is requested;
  the opening of the protective curtain occurs and the robotic arm initiates the movement of the cassette towards the technical cabinet, the technical cabinet-cassette automatic locking fittings being disabled; the technical cabinet-cassette automatic locking fittings are enabled; and then the cassette-arm automatic locking fittings are disabled;
  the movement of the robotic arm away from the technical cabinet occurs, enabling the robotic arm and by extension the machine, to realize the milling operation.
  Release of milling tool:
  the tree executes the function of releasing the tool installed on the cassette, releasing the cone from the milling tool, followed by the linear movement of the tree away from the cone, to an extreme position on the base structure of the robotic arm;
  the movement of the robotic arm towards the technical cabinet of the milling tools and the opening of the protective curtain occurs;
  then the storage of the milling tool in the technical cabinet and the closure of the curtain occurs.

BRIEF DESCRIPTION OF THE FIGURES

For better understanding of this application, we attach figures that represent preferential achievements but which do not seek to limit the technique hereby disclosed.

2—cassette;
10—cassette-arm automatic locking fittings;
15—tree.

Figure 1:
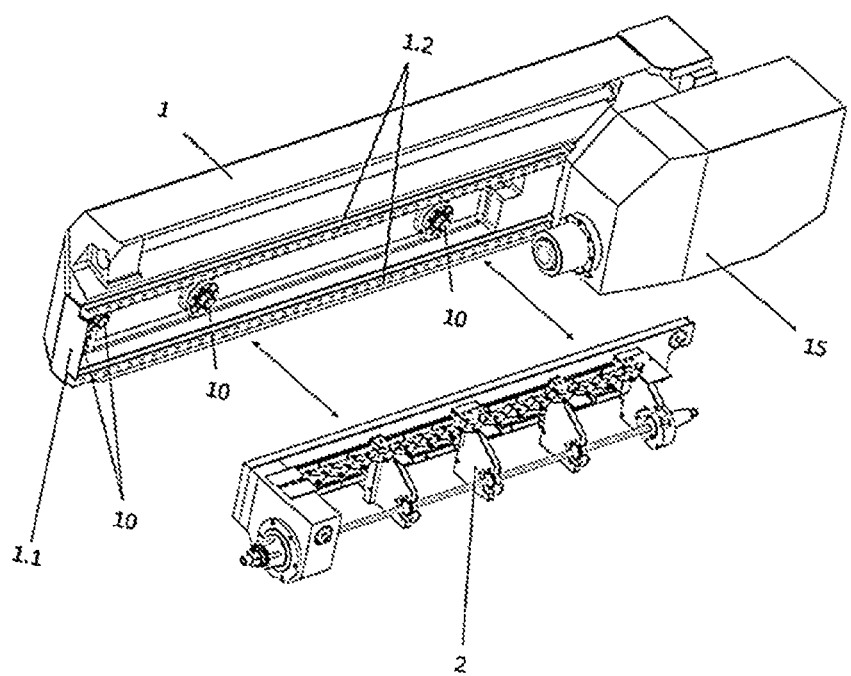
FIG. 1 illustrates the coupling of a cassette to the base structure of the robotic arm, where the numerical reference marks signify:
1—robotic arm;
1.1—base structure;
1.2—sliding rails.
Figure 2:
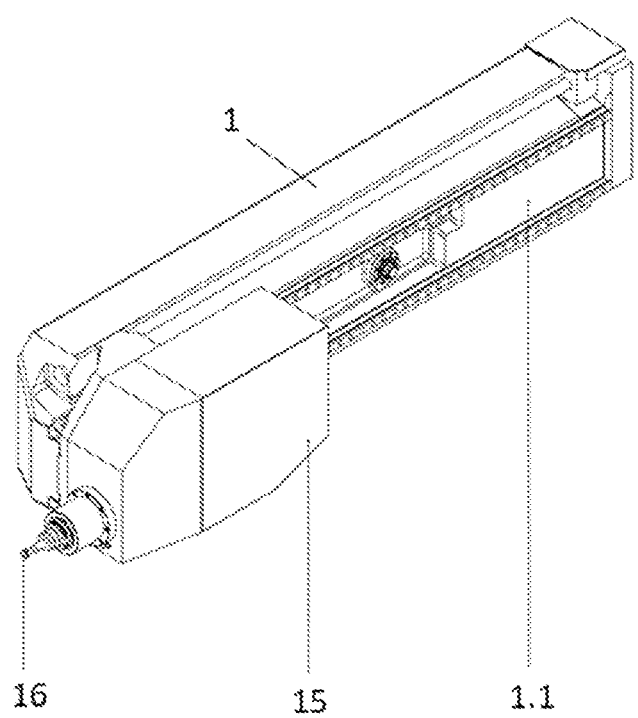

FIG. 2 illustrates the robotic arm configured to perform the milling operation, where the numerical reference marks signify:
1—robotic arm;
1.1—base structure;
1.2—sliding rails;
15—tree;
16—milling tool.

Figure 3:
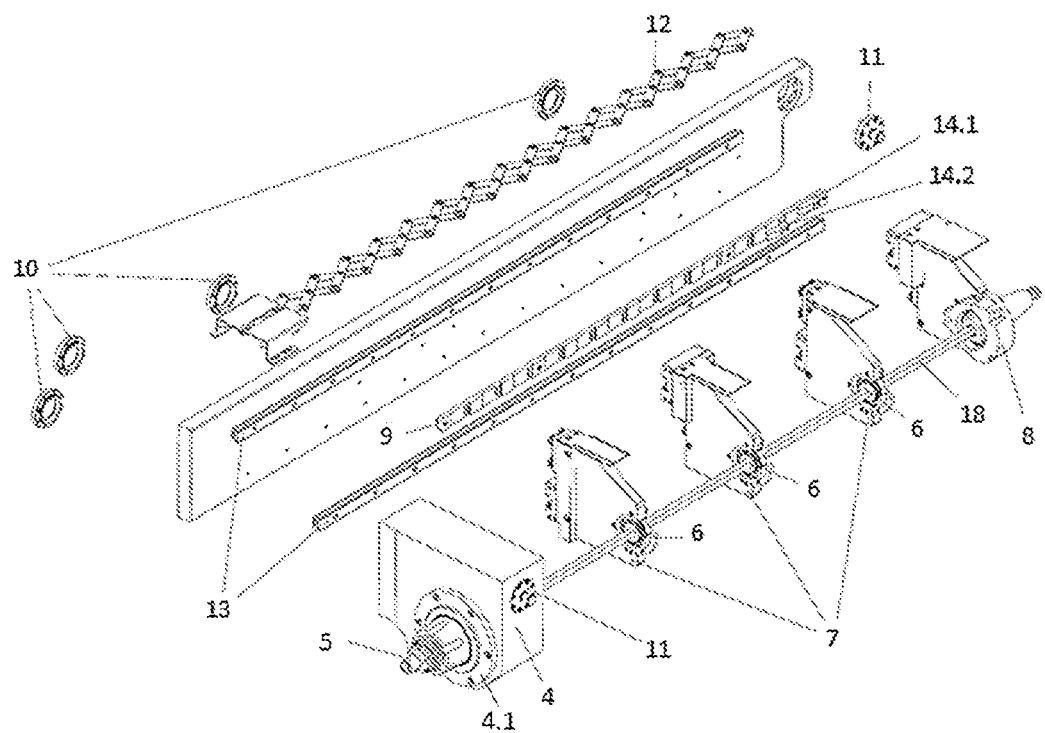

FIG. 3 illustrates an exploded view of a cassette, where the numerical reference marks signify:
4—filings box;
5—tip of the tool;
6—dampers;
7—bezel;
8—cone support;
9—adjustment ruler and cone support lock;
10—cassette-arm automatic locking fitting;
11—technical cabinet-cassette automatic locking fitting;
12—bezel spacing scissors;
13—bezel guide and cone support;
14.1—enabled cone support locking castle;
14.2—disabled cone support locking castle;
18—tool.

Figure 4:
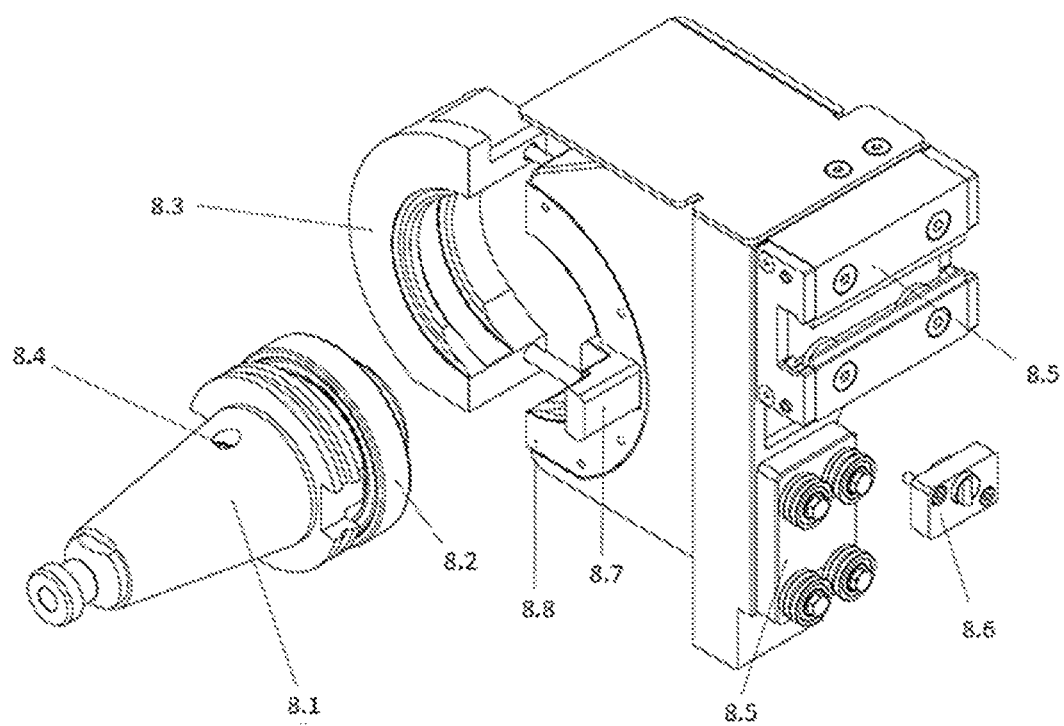

FIG. 4 illustrates a detailed view of the cone support element, where the numerical reference marks signify:
8.1—cone;
8.2—cone support bearing;
8.3—mobile flange;
8.4—tool locking pin;
8.5—glides;
8.6—mechanical locking mechanism;
8.7—rotation locking mechanism;
8.8—fixed flange.

Figure 5:
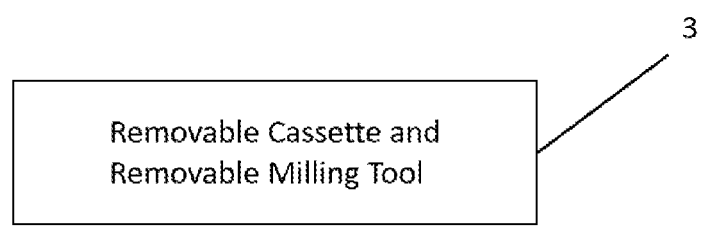
Figure 6:
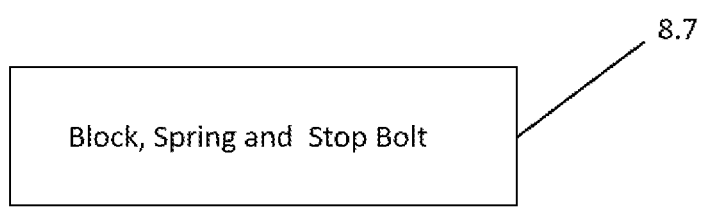

FIG. 5 schematically illustrates the technical cabinet (3).
FIG. 6 schematically illustrates the rotation locking mechanism (8.7).

DESCRIPTION OF EMBODIMENTS

Referring to the figures, some embodiments are now described in more detail, which are not, however, intended to limit the scope of this application.

In one preferential embodiment of the milling and deep drilling machine developed, it comprises on the inside, a robotic arm (1), adapted to perform 3-dimensional linear movements over the entire interior space of said machine, a technical cabinet (3), loaded with multiple cassettes (2), and a control unit configured to command the operations of deep milling or deep drilling, through coordinated control of the actions of the robotic arm (1) and the technical cabinet (3).

The cassette (2) is configured to carry different types of tools (18), with respective diameter and/or length values, and for this purpose, each cassette (2) is comprised of:
Filings box (4) containing frontal (4.1) and rear (not illustrated) flanges;
Tool tip (5);
Dampers (6);
Bezels (7);
Cone support (8);
Adjustment and locking ruler for the cone support (9);
Cassette-arm automatic locking fitting (10);
Technical cabinet-cassette automatic locking fitting (11);
Bezel spacer scissors (12);
Bezel guide and cone support (13);
Enabled cone support locking castle (14.1);
Disabled cone support locking castle (14.2);
Tool (18).

The number of bezels (7) that a cassette (2) possesses varies depending on the length/diameter ratio of the tool (18). Each bezel (7) consists of a locking plate and two elastic tabs, and its function is to attach the damper that is intended to fix the tool (18) to the cassette (2), and to ensure its stability during the operation. In addition to this, depending on the diameter of the tool (18), the dampers (6) also vary, there being a specific damper for each tool diameter.

The assembly or disassembly operation of a tool (18) of the cassette (2) is performed by an operator, or at a stage prior to storing the cassette (2) in the technical cabinet (3) or it is previously stored through an access door to the cabinet (3). The cone of the tool (8.1) holds the bearing (8.2) that sustains it in the cone support (8), and through the opening of the mobile flange (8.3) it is possible to insert it or remove it from the support together with the tool (18), and with the loosening of the locking pin (8.4) it is possible to assemble or disassemble the tool (18). Depending on the length of the tool (18), the cone support (8) is positioned by means of the glides (8.5) on the cassette (2) and fixed by means of the mechanical locking mechanism (8.6), which is positioned on the adjustment ruler (9) through the locking castle of the enabled cone support (14.1).

The cone support (8) is positioned on the cassette (2) through a locking mechanism, called the mechanical locking mechanism (8.6) and by means of the adjustment ruler (9) which is equipped with lock enabling castle and lock disabling castle (14.1, 14.2). These allow for the assembly of different lengths of tool, making the cassette (2) flexible. The cone support locking castle, can assume two positions as enabled with the lock enabling castle (14.1) and disabled with the lock disabling castle of (14.2) the cone support (8) of the tool in the desired position.

The rotation locking mechanism (8.7) has the function of ensuring the locking of the rotation of the cone of the tool that is coupled to the tree (15). This is composed of a block, a spring and a stop bolt, embedded in a box of the fixed flange (8.8). The block moves linearly on a course restricted by the action of the spring and the stop bolt. Both in the tying and untying of the cone of the tool (8.1) it is guaranteed that the tree (15) positions the cone (8.1) in alignment with the locking mechanism (8.7). The block assumes two positions, a locked position and an unlocked position. The locked position is the normal position by default, guaranteed by the action of the spring, which exposes the geometry of the block in order to lock the cone (8.1). The unlocked position is produced by the resting action of the tree (15) at the time of the tying of the cone (8.1), causing the block to enter the box of the fixed flange thus unlocking the rotation of the cone (8.1). This action occurs with the pressing of the spring that exerts a lesser force on the mechanical locking mechanism (8.6) so that the cone support (8) does not move during the tying action.

The cassette (2) is installed in the base structure (1.1) of the robotic arm (1), by means of complementary automatic ties—cassette-arm automatic locking fitting (10) and technical cabinet-cassette automatic locking fitting (11).

The cassettes are stored in the technical cabinet (3), by means of automatic ties—technical cabinet-cassette automatic locking fittings (11)—being accessible to the robotic arm (1), for later automatic installation, without the need to interrupt the machining cycle. In one particular embodiment, the technical cabinet (3) comprises a protective curtain, to keep the cassettes protected from the filings and oil. The technical cabinet (3) comprises a window that gives access to the exterior for manual intervention of the operator that feeds the cassettes (2) stored therein with the tools (18).

The machine is commanded by the action of a control unit, which is responsible for controlling the integrated operation of the robotic arm (1) and the technical cabinet (3), acting at the level of the drive of the automatic locking fittings (10), (11), of the protective curtain of the technical cabinet (3) and at the level of the tree (15), for the operationalization and configuration of the milling and deep drilling actions.

This description is not, of course, in any way restricted to the achievements presented in this document and a person with average knowledge of the area may foresee many possibilities of modifying it without deviating from the general idea, as defined in the claims. The preferred achievements described above are obviously combinable with each other. The following claims additionally define preferential achievements.

The invention claimed is:
1. A milling and drilling machine comprising:
   a robotic arm (1), configured to perform 3-dimensional linear movements over an entire interior space of the milling and deep drilling machine, the robotic arm comprising:
      a base structure (1.1) comprising sliding rails (1.2) and cassette-arm locking fittings (10);
      a drive unit (15) that moves along a longitudinal direction of the base structure (1.1) over the sliding rails (1.2);
   a removable milling tool (16) couplable to the drive unit (15);
   a removable cassette (2) comprising:
      a plurality of supports (7), each supporting a corresponding damper (6) for fixing a drilling tool (18) to the cassette (2);
      a tool tip (5) on one end of the removable cassette and a cone support (8) at an opposite end of the removable cassette (2);
      a further support (13) for guiding and supporting: (i) the plurality of supports (7); and (ii) the cone support (8);
      a support-spacing scissors (12); and
      an adjustment ruler (9);
      complementary cassette-arm locking fittings that connect to the cassette-arm locking fittings (10) of the base structure (1.1) of the robotic arm (1);
      a cone (8.1) that holds a bearing (8.2) for holding the cone (8.1) in the cone support (8), wherein the cone (8.1) is configured to couple to the drive unit (15); and
      a locking pin (8.4) for locking and unlocking the drilling tool (18) with respect to the cone (8.1);
   wherein the cone support (8) comprises:
      a fixed flange (8.8);
      a rotation lock (8.7) for locking the rotation of the cone (8.1), wherein the rotation lock (8.7) is embedded in the fixed flange (8.8);
      a mobile flange (8.3), facing the fixed flange (8.8), such that the cone (8.1) can be inserted in and removed from an opening between the mobile flange (8.3) and the fixed flange (8.8);
      a glide (8.5) for adjusting the positioning of the cone support (8) on the removable cassette (2); and
      a mechanical lock (8.6) for fixing the cone support (8) with respect to the further support (13);
   the milling and drilling machine further comprising:
      a technical cabinet (3) storing therein the removable milling tool (16) and the removable cassette (2), wherein the technical cabinet is in a location in the milling and drilling machine where the robotic arm (1) can reach;
      a control configured to operate the robotic arm (1) and the technical cabinet.

2. The machine according to claim 1, wherein the rotation lock (8.7) comprises a block, a spring and a stop bolt, wherein the block moves linearly on a course restricted by the action of the spring and the stop bolt.

* * * * *